United States Patent [19]

Klein

[11] Patent Number: 4,664,812
[45] Date of Patent: May 12, 1987

[54] LIQUID FILTRATION APPARATUS AND PROCESS

[75] Inventor: Max Klein, P.O. Box 3, Dalton, Mass. 01226

[73] Assignee: Max Klein, Pittsfield, Mass.

[21] Appl. No.: 550,953

[22] Filed: Nov. 10, 1983

[51] Int. Cl.[4] .......................... B01D 15/04; B01D 25/04
[52] U.S. Cl. ..................................... 210/679; 210/692;
210/683; 210/685; 210/778; 210/193; 210/232;
210/266; 210/283; 210/437; 210/488; 210/492;
210/503
[58] Field of Search ............ 210/282, 283, 266, 502.1,
210/505, 446, 488, 489, 492, 457, 437, 193, 232,
685, 503, 512.1, 691, 692, 679, 683, 777, 778;
521/32, 33

[56] References Cited

U.S. PATENT DOCUMENTS

| | | | |
|---|---|---|---|
| 2,345,543 | 3/1944 | Wonsiedler et al. | 260/72 |
| 2,559,220 | 7/1942 | Maxwell et al. | 92/3 |
| 2,904,186 | 9/1959 | Moore | 210/437 |
| 3,319,795 | 5/1967 | Schmidli | 210/492 |
| 3,821,127 | 6/1974 | Mizutani et al. | 521/33 |
| 3,950,251 | 4/1976 | Hiller | 210/282 |
| 3,997,644 | 12/1976 | Sano et al. | 521/33 |
| 4,199,443 | 4/1980 | Tauber | 210/512.1 |
| 4,200,679 | 4/1980 | Klein | 521/918 |
| 4,207,378 | 6/1980 | Klein | 521/918 |
| 4,212,743 | 7/1980 | Van Meter et al. | 210/282 |
| 4,221,663 | 9/1980 | Little | 210/193 |
| 4,234,326 | 11/1980 | Bailey et al. | 55/278 |
| 4,239,516 | 12/1980 | Klein | 210/505 |
| 4,251,374 | 2/1981 | Cunningham | 210/282 |
| 4,286,977 | 9/1981 | Klein | 55/524 |
| 4,293,378 | 10/1981 | Klein | 162/145 |
| 4,336,140 | 6/1982 | Smith et al. | 210/685 |
| 4,350,590 | 9/1982 | Robinson | 210/492 |
| 4,395,332 | 7/1983 | Klein | 210/505 |
| 4,422,938 | 12/1983 | Miller | 210/437 |
| 4,454,044 | 6/1984 | Klein | 210/778 |

Primary Examiner—David L. Lacey
Attorney, Agent, or Firm—Dann, Dorfman, Herrell & Skillman

[57] ABSTRACT

An apparatus for effecting filtration, clarification and purification of liquid which comprises a housing containing a filter element made up of a plurality of layers of adsorbent material, comprising a porous, non-woven fibrous matrix in which is included an adsorbing agent for removing dissolved or suspended matter from the liquid, and a plurality of layers of liquid-permeable material. The layers of adsorbent material and liquid-permeable material are interdigitated in a stack between liquid impervious walls, and the flow of liquid through the filter element is along path generally parallel to the confronting surfaces of the layers of adsorbent material and liquid-permeable material. A process for removing dissolved, suspended or particulate matter from a liquid containing same, utilizing the filter apparatus, is also disclosed.

39 Claims, 5 Drawing Figures

LIQUID FILTRATION APPARATUS AND PROCESS

BACKGROUND OF THE INVENTION

The present invention relates to an apparatus and process for removing dissolved, suspended and particulate matter from liquid containing same, and especially concerns the removal of color-, taste-, odor-, and turbidity-producing impurities from water supplies and waste streams. More particularly, this invention relates to the filtration, clarification and purification of water and to a novel apparatus for achieving such treatment.

Conventional water treatment facilities are effective for removing from water a wide range of impurities including particulate matter, such as mineral fibers, clays and microbial substances, as well as suspended and dissolved matter, e.g. chlorinated organics and various other color-, order-, taste-, and turbidity-producing impurities.

Many municipal and industrial water treatment plants employ systems in which raw water is pretreated, typically by coagulation/flocculating and sedimentation, after which it is filtered and disinfected. Municipal water may be treated further by using activated carbon, oxidation and aeration, when necessary for taste, order or bacteria control. Demineralization and ultrafiltration are also employed for certain industrial uses where complete removal of dissolved matter is required.

Coagulation is ordinarily carried out in a rapid mixing tank by adding to the raw water a chemical agent which causes agglomeration of the suspended matter into larger particles which settle to the bottom of a containment vessel. The agglomerated particles, or floc, are sometimes subjected to gentle agitation in order to form floc bundles large enough to settle rapidly. A separate flocculation tank is often provided for this purpose.

Sedimentation is the process by which floc is separated from water by precipitation and deposition and depends on the effect of gravity on particles suspended in a liquid of lesser density. Sedimentation without pretreatment is rarely adequate for clarification of turbid water, for example, as it does very little for removal of fine particulate substances such as clay, bacteria, and the like. Also sedimentation results in sludge formation, requiring that sludge disposal means be provided.

After the raw water has undergone appropriate pretreatment, it is filtered for the removal of remaining suspended particles by passage through a porous medium. Most conventional water treatment systems of this type employ granular media filtration. For example, rapid sand filters and mixed media filters (e.g. sand and anthracite coal) have been applied on a municipal scale for many years. The filtrate or effluent is then treated with a disinfectant, or sterilant, typically chlorine or ozone. Further processing for taste, odor and bacteria control typically involves additional specialized equipment, including activated carbon columns, aerators and treating chemicals, such as chlorine. The same is true in the case of industrial water that requires demineralization or ultrafiltration.

A significant drawback of water treatment systems of the type just described is the substantial cost involved in the installation, operation and maintenance thereof. Moreover, water treatment systems involving granular media filtration are often plagued by short filtration cycles resulting from clogging of the media by appreciable amounts of suspended matter not removed during pre-treatment, and, in the case of mixed media filtration, by anthracite coal fines which accumulate on the upper surface of the media bed after repeated back washing and tend to inhibit effective penetration of impurity particles into the media. Other operational problems that are often experienced in granular media filtration are low filter capacity and channelling.

Although there has been considerable effort toward improving these prior art water treatment systems, the improvements have related generally to enhancing floc formation and sedimentation, reducing the load on the filters, and using larger grain sand and higher filtration rates as a means of reducing cost.

Filter-aid filtration, long used in numerous industries for liquid clarification, has been employed in municipal and industrial water treatment for several decades as an alternative to granular media filtration. Filter-aid filtration offers a distinct economic advantage over granular media filtration in that the need for large and expensive vessels for floc formation and sedimentation is virtually eliminated, since water is seldom, if ever, pre-conditioned for filter aid filtration.

Filter-aid filtration systems commonly consist of an industrial-type filter with a filter membrane arranged usually in a series of leaflets. The membrane is pre-coated on the upstream side with a thin layer of filter aid of a pre-determined particle size, which forms the pre-coat filter cake. The materials most often used as filter aids are diatomaceous earth, perlite, finely divided carbon, and fibrous materials, such as cellulose and various synthetic fibers. As water flows through the cake, the solid impurities present in the water are caught in small pores of the filter cake. Additional filter aid, referred to as "body feed", is normally admixed with the stream of raw water, and the suspended impurities together with the added filter aid are retained on the filter membrane. The layer of sediment and filter aid is subsequently removed by backwashing, which must be rather thorough so that the new pre-coat will readily form on the membrane.

Although the performance of filter aid filtration systems has been satisfactory in many respects, these systems are not without certain deficiencies. For example, water supplies and waste water streams frequently contain substances, such as pathogenic microorganisms, that are too finely divided to be removed by commercially available grades of filter aid materials. While it is possible that a filter aid could be produced which is capable of effectively removing such substances from the filtrate, the liquid flow resistance of such a filter aid material would be so high as to make its use impractical.

The use of resin-bonded fiber filters for liquid filtration is also well known. It has been proposed to improve such filters by the addition of finely divided adsorbing agents, such as activated carbon, to remove from liquids treated therewith certain dissolved substances, e.g. taste-, odor-, and color-producing organic substances, chlorine, pesticides and other toxic organics. Such proposals have not been particularly successful, however, since the resin binder is required in such an amount as to diminish considerably the effective surface area of the particulate adsorbent. Consequently, the adsorption capacity of the filter is substantially reduced, necessitating frequent replacement of the filters. Moreover, resin-bonded fiber filters containing particulate adsorbing agents are often characterized by extremely low fluid permeability, and a high pressure drop, making them inappropriate for many liquid filtration applications, especially in the treatment of waste water streams of high solids content.

While recent developments in the art have somewhat reduced the cost of installation and equipment maintenance, the overall operating expense of present day water treatment facilities remains relatively high. In short, the cost of water treatment, whether by granular media filtration, filter-aid filtration or resin-bonded fiber filters, makes it uneconomic for many smaller size municipalities and industries which might advantageously employ a water treatment plant. Hence, the development of an effective and efficient process for producing substantially pure, clear water for domestic and industrial consumption at a reasonable cost continues to be a highly desired objective.

SUMMARY OF THE INVENTION

In accordance with the present invention, it has now been discovered that color-, odor-, taste-, and turbidity-producing impurities are substantially completely removed from liquid containing same by passing a stream of the liquid through a filter device comprising housing means including an inlet and outlet for directing liquid flow through the housing means and a dividing means which divides the housing into inlet and outlet chambers. The dividing means comprises filter means including a stack of alternate layers of an adsorbent material and a liquid-permeable material, which is assembled such that the path of liquid flow through the device is generally parallel to the confronting surfaces of the layers of adsorbent material and liquid permeable material and which is disposed between seal means preventing the flow of liquid axially from the ends of the stack. In one embodiment, the filter means is mounted between opposing end walls or plates of liquid impervious material. In another embodiment, the filter means is disposed between the aforesaid seal means which are immovably mounted on a perforated duct extending into the outlet chamber. In a perferred form of this latter embodiment, the seal means is provided by a compression gland and an interior wall surface of the housing means.

The filtration device of the present invention is of simple construction and inexpensive to manufacture, install, operate and maintain. Unlike most water treatment systems employing granular media filtration, pretreatment of the raw water is not required for successful operation of the apparatus and process of the present invention. Moreover, the capacity of the filtration device may be increased, when necessary, simply by adding additional layers of adsorbent material and liquid-permeable material. Increasing capacity in this manner has the effect of decreasing liquid flow resistance.

In operating the filtration device of this invention gravity flow or pressure operation may be used. In general, the device has a relatively low pressure drop and may be backwashed easily using a small back pressure. This device has high filtration efficiency, with the capability of removing from the liquid undergoing treatment finely divided particles as small as 0.5 microns, or less, while providing reasonable flow rates with relatively long filtration cycles for most liquids. The need for any separate treatment using a micro-porous filter is, therefore, substantially eliminated. Another desirable feature of the present filter apparatus is that the filter element used therein is compatible with a wide variety of liquids.

The adsorbent material used in the filter device of this invention comprises a porous, non-woven fibrous matrix in which is included an adsorbing agent for eliminating from the filtrate dissolved or suspended matter, such as color-, taste-, and-odor producing organic substances, toxic organics and various charged species, e.g. salts adversely affecting taste. Thus, the filter device of this invention is effective not only for particulate removal, by a physical sieving or straining mechanism, but also for elimination and retention of various dissolved substances by mutual attraction between such substances and the adsorbing agents. What's more, the full adsorption capacity of the adsorbing agent may be brought to bear on the liquid undergoing treatment, as no resin binder is required in preparing the adsorbent material. Suitable adsorbing agents include activated carbon, diatomaceous earth, ion exchange resins, and zeolites.

The filtration device of the present invention is preferably used in conjunction with a filter aid material particularly in gravity flow applications. Use of a filter aid enables removal of a substantial portion of suspended impurities from the raw water undergoing treatment, which impurities may otherwise tend to accumulate on the surface of the stack of adsorbent material and liquid-permeable material and obstruct the flow of liquid therethrough. Unlike previous filter aid filtration systems, however, the filtration apparatus of the present invention is capable of removing from a liquid stream extremely finely-divided particulate matter, including submicron particles, under normal conditions. It should be understood that, while preferred, the use of a filter aid in operating the apparatus and process of the present invention is not essential.

In using the filter device of the present invention for pressure filtration of particularly refractory waste streams, such as the "white water" generated by paper making plants, which have a high content of viscid colloidal matter, it is desirable to provide a second outlet in the housing to permit a portion of the waste stream to by-pass the filter element, thereby slowing the rate of the filter cake accumulation and enabling longer filtration cycles. Another advantage of providing a by-pass outlet is that it reduces the amount of filter aid required in operating the device. Preferably, the housing of the filter device equipped with a by-pass outlet is designed such that the cross-sectional area is substantially larger at the inlet end than at the outlet end, with the direction of flow of the effluent stream and by-pass stream, upon entering and exiting the housing, respectively, being perpendicular to the longitudinal axis of the housing. In this design, the filtration device also functions as a hydrocyclone. Solids in the incoming waste stream, which is under pressure, are concentrated by centrifugal force against the wall of the housing and accelerated toward the by-pass outlet. Blinding of the filter element by solids present in the liquid stream is accordingly reduced.

A plurality of filter devices of the present invention, having a different adsorbing agent in each, may be connected in series to obtain an exceptionally pure filtrate. For example, a multi-unit filter may be assembled by connecting a first unit in which the adsorbing agent is activated carbon, to a second unit, in which the adsorbing agent is a cation exchange resin, with the two units being connected, in turn, to a third unit in which the adsorbing agent is an anion exchange resin. A filter assembly of this type provides efficient removal of dissolved organics and electrically charged species, as well as particulate and colloidal matter from liquids contaminated therewith.

The filtration apparatus and process of the present invention have wide ranging applications, including the treatment of domestic and industrial water supplies and waste water streams, such as those generated in hydrometallurgical processes, paper making and dye manufacture. In addition, the filter apparatus may be made small enough to be portable, making it useful for military personnel, outdoorsmen, and the like, to provide a supply of potable water from any source. Irrespective of the particular application, the present invention provides a practical means for overcoming the deficiencies of the prior art liquid treatment systems noted above, and enables the production of pure, clear liquid at a relatively low cost.

Other aspects and advantages of the present invention will be apparent to those skilled in the art from the following detailed description thereof, read in conjunction with the accompanying drawing in which:

FIG. 3 is a perspective, inverted view of the filtration device of FIG. 2, with a by-pass outlet;

FIG. 4 is a perspective view of a filtration device which has the same general design as that of FIG. 3, but which has been modified for hydrocyclone operation.

DETAILED DESCRIPTION OF THE INVENTION

Figure 1:
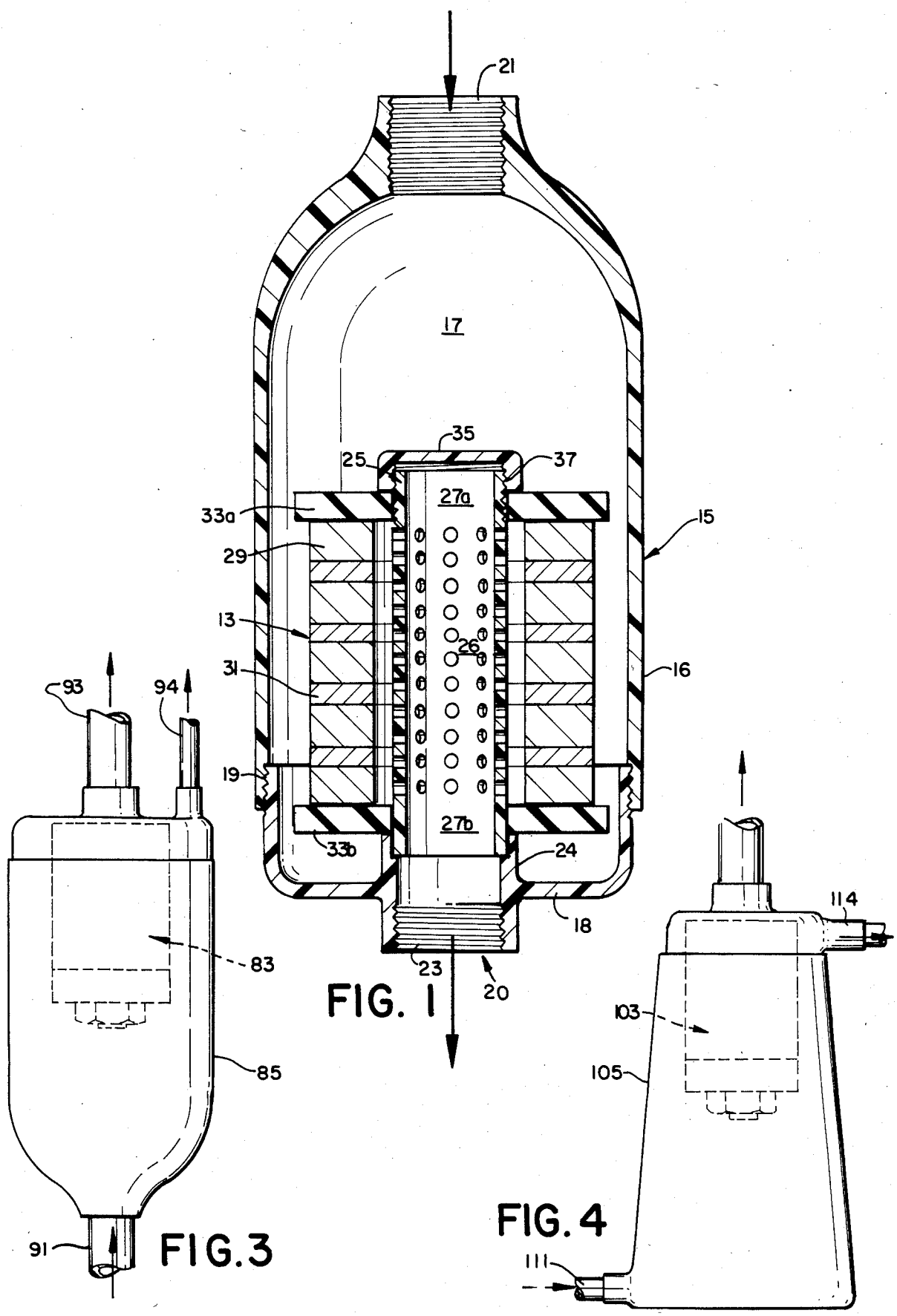
FIG. 1 is a cross-sectional view of a liquid filtration device in accordance with the present invention.

Referring specifically to the drawing, in FIG. 1 there is shown a liquid filtration device of the present invention, comprising a filter element 13 mounted in a housing 15. The filter element effectively divides the housing into an inlet chamber 17 and an outlet chamber 20. The housing comprises a tubular shell 16 and an end cap 18. End cap 18 is preferably removably attached to tubular shell 16, e.g. by means of screw threads 19 for joining the two parts together, so as to facilitate replacement of filter element 13, when necessary. Other attachment means known to those skilled in the art may also be used to join the housing components. Openings 21 and 23 are provided in tubular shell 16 and end cap 18, respectively, for passing a stream of liquid through filter element 13. Projecting into housing 15 at opening 23 is an annular flange 24. Secured in flange 24 is a tubular duct or nipple 25 which has a perforated intermediate portion 26 and non-perforated end portions 27a and 27b, and which is in fluid communication with outlet opening 23.

Filter element 13 comprises a plurality of layers of adsorbent material 29, comprising a porous, non-woven fibrous matrix in which is included an adsorbing agent for removing dissolved or suspended matter from the liquid being filtered, and a plurality of layers of liquid-permeable material 31 which are interdigitated in a stack and disposed between opposite end walls or plates 33a and 33b of liquid impervious material, preferably a non-porous rubbery sheet material. Each layer of adsorbent material and liquid-permeable material has substantially flat surfaces confronting and engaging the next adjacent layer of adsorbent material or liquid-permeable material. The adsorbent material and liquid-permeable material of the filter element are cut to a pre-determined size and shape and disposed between annular end walls or plates 33a and 33b, the latter seated on flange 24. The materials may take a variety of shapes, however, annular sheets or discs are preferred. The stacked annular discs provide a filter zone having substantially coextensive interior and exterior dimensions defined by the inside and outside disc edges, the flow path through the filter zone being edge to edge through the stacked discs, with one edge being in fluid communication with inlet chamber 17 and the other edge being in fluid communication with outlet chamber 20. Tubular duct 25 extends axially into the outlet chamber.

Filter element 13 is held in place on tubular duct 25 by stop means which maintains the layers of adsorbent material and liquid permeable material under a compressive force between the end walls. As shown in FIG. 1, the stop means comprises a pipe cap 35 which is adapted for engagement, e.g. by means of screw threads 37 on the unperforated portion 27a of tubular duct 25. Pipe cap 35 is adjustable relative to tubular duct 25, permitting variation of the compressive force on the stack of discs of adsorbent material and liquid-permeable material between the end walls. If desired, pipe cap 35 may be made integral with end wall 33a.

Liquid to be filtered may be introduced at opening 21 and discharged at opening 23, or vice versa. The filter device operates most efficiently when the liquid enters at opening 21, flows from the periphery of the stacked discs of adsorbent material and liquid-permeable material toward the hollow center of the stack of discs, into tubular duct 25 and out through opening 23.

Figure 2:
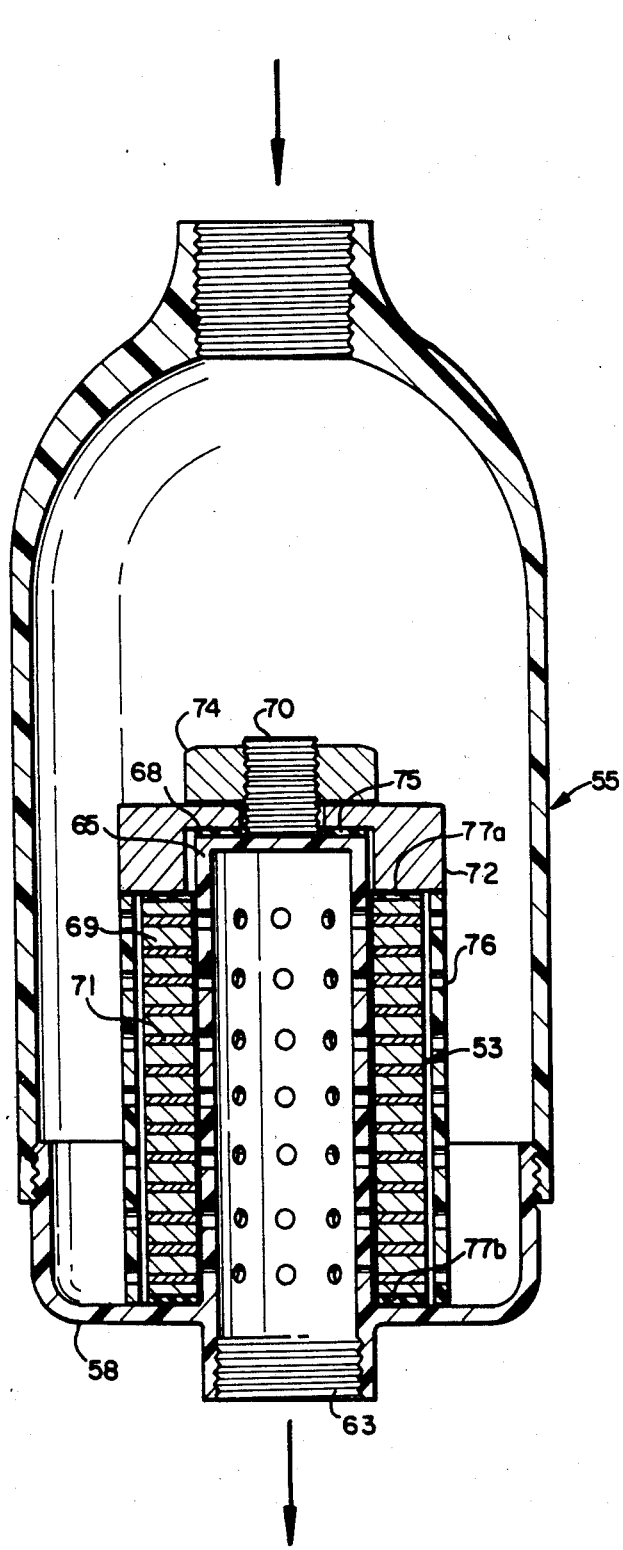
FIG. 2 is a cross-sectional view of another embodiment of the filtration device, which is especially adapted for pressure operation.

In FIG. 2 there is shown a filter apparatus of the present invention designed especially for pressure operation. The filter device of FIG. 2 has certain structural features in common with the device illustrated in FIG. 1, in that filter element 53 comprises alternate layers of adsorbent material 69 and liquid-permeable material 71 and is mounted on a perforated tubular duct 65 in fluid communication with an opening 63 in housing 55. However, the tubular duct 65 is closed at its free end 68, to which is affixed a stud or lug 70, for immovably mounting a compression gland 72 by means of compression nut 74, which serves to maintain the filter element 53 in place on tubular duct 65 under a compressive force. Compression gland 72 is a rigid sealing element which is in sealing contact with the opposing surfaces of perforated sleeve 76 and filter element 53 and serves to maintain the filter element 53 in place on tubular duct 65 under a compressive force. The function of compression gland 72 is to prevent passage of unfiltered liquid through tubular duct 65. Such faulty operation could occur in a device of the type shown in FIG. 1, when the operating pressure of the filter device is greater than the compressive force imposed on the stack of adsorbent and liquid-permeable discs at the time of assembly of the device, thus causing further compression of the stack and exposing perforations in tubular duct 65. By-pass leakage is prevented by the use of a compression gland 72, since the hydrostatic pressure acts on the compression gland and not on the topmost disc of the stack. In high pressure aplications additional sealing means, e.g. a rubber washer 75 should be placed between the closed end of tubular duct 65 and compression gland 72 in order to prevent by-pass leakage along the threads of stud 70. In addition, means may be provided to prevent dislodgment of the stop means during high pressure operation. The insertion of one or more lock washers between compression gland 72 and compression nut 74 is beneficial for this purpose.

The filter device of the invention may also be provided with a perforated cylindrical sleeve 76 as shown in FIG. 2 which surrounds filter element 53. As can be seen in FIG. 2, the dimensions of sleeve 76 are such that it snugly fits around and covers the periphery of filter element 53. Perforated sleeve 76 functions as a stop for the compression nut 74, which acts on compression gland 72 to cause active compression of the stack of discs until gland 72 contacts the opposing surface of sleeve 76.

In the embodiment of FIG. 2, the filter element is supported by the interior surface of end cap 58 of housing 55, rather than by separate annular end wall, as in the device of FIG. 1. Thus, compression gland 72 and the interior confronting wall surface of end cap 58 on which filter element 53 rests serve as seal means to prevent penetration of liquid into the ends of the stack, just as liquid impervious end walls 33a and 33b do in the device of FIG. 1. Compressible rubber discs 77a, 77b may be inserted between the stack of interdigitated sheets of adsorbent material and liquid permeable material, and compression gland 72 and end cap 58, respectively, to further seal the filter element against by-pass leakage.

In FIG. 3, there is shown a filter device of the present invention which is adapted for pressure filtration of a waste stream having a high solids content of viscid substances. The housing 85 is positioned with outlet 93 disposed above inlet 91, in order to facilitate backwashing. A by-pass outlet 94 is provided to retard the rate of filter cake build-up on filter element 83 (shown in phantom), thereby permitting longer filtration cycles. The effluent from by-pass outlet 94 is directed to the suction side of the pump that delivers the waste stream to inlet 91.

FIG. 4 illustrates another form of the embodiment of FIG. 3, in which the housing has been modified to produce a hydrocyclone effect on the solids present in the waste stream passing through the device. Specifically, the housing 105 is tapered, with the inlet end being greater in cross-sectional area than the outlet end, with the inlet 111 and by-pass outlet 114 directing the influent and effluent, respectively, along a path which is substantially perpendicular to the longitudinal axis of the housing. This design causes concentration of the solids content of the influent against the walls of the housing, thus preventing accumulation of solids on filter element 103 (shown in phantom). A high velocity stream of concentrated solids is discharged from by-pass outlet 114, and combined with the influent waste stream.

Figure 5:
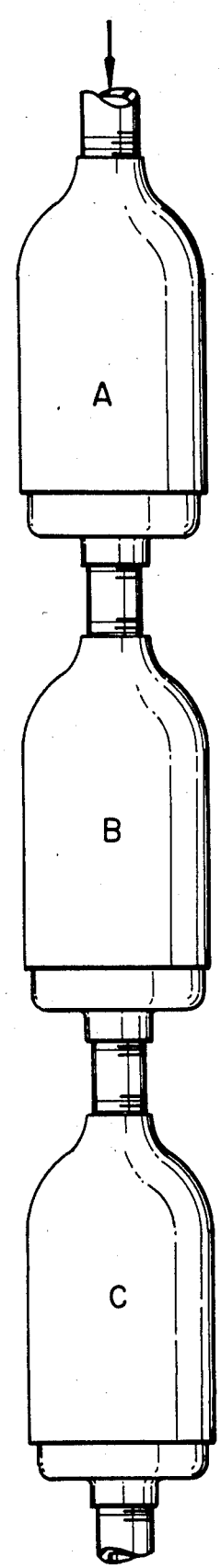
FIG. 5 is a perspective view of a multi-unit assembly of filter devices of the present invention.

A multi-unit assembly of filter devices of the present invention is shown in FIG. 5. The structure of the filter units corresponds generally to that of FIG. 1, but each unit contains an adsorbent material with a different adsorbing agent therein. For example, unit A may contain activated carbon, unit B may contain cation exchange resin and unit C may contain anion exchange resin. Such an assembly is particularly useful for treating water containing dissolved organics and ionized substances, such as brackish water. In a multi-unit assembly, such as shown in FIG. 5, it is preferable that at least one unit have cation exchange capability and at least one unit have an anion exchange capability for effective water deionization.

The above-described filter devices are easily assembled from readily available components. The housing components may be made from corrosion resistant metals, such as stainless steel or aluminum, or of molded plastic, such as polyvinyl chloride, polyethylene, polypropylene, nylon or polytrafloroethylene. The housing components of the device may be assembled using well known joining techniques, such as welding, soldering, or brazing in the case of metal parts, or by any of a variety of commercially available adhesives, in the case of plastic parts. When ion exchange material is to be used in the filter device, it is preferable to use molded plastic housing components, since any acid used to regenerate the ion exchange material would have a deleterious effect on metal parts. On the other hand, when the filter device is to be used under relatively high pressure, heavy gauge metal housing components should be employed.

Any porous, non-woven, fibrous matrix containing an adsorbing agent capable of removing dissolved or suspended matter from a liquid may be used as the adsorbent material in the filter device of this invention. A preferred adsorbent material is the adsorption and filtration mat for liquids described in my U.S. Pat. No. 4,395,332, granted July 26, 1983. Briefly, the material consists of randomly arranged, irregularly intersecting and overlapping cellulose fibers, an adsorbing agent, such as finely divided activated carbon, and polymer micro-bits. The last named component is produced from an expanded, non-brittle thermoplastic polymer selected from the group of styrene-polymers, lower polyolefins and copolymers or blends of such polymers, or from a flexible foamed polyurethane. Polymer micro-bits are characterized by a substantial absence of intact cell structure of the expanded or foamed polymer starting material from which they are produced. These polymer micro-bits, along with the process of preparing same is fully described in my U.S. Pat. Nos. 4,207,378, issued Apr. 29, 1980, and 4,200,679, issued Apr. 29, 1980, the entire disclosures of which are incorporated in the present specification by reference, as if actually set forth herein in full. The polymer micro-bit serve primarily as an aid in retaining the particulate adsorbing agents in the adsorbent material. The polymer micro-bits are capable of retaining in the matrix of the adsorbent material the high solid loadings of adsorbing agents described below, without the need of an organic resin binder.

Cellulose fibers may be replaced by various other natural or synthetic fibers without altering the efficiency or effectiveness of the adsorbent material. Other suitable fiber materials include polyesters, such as polyethylene terephthalate, polyolefin, polyamide, polyvinyl, polystyrene, and fluorocarbon resin fibers, acetate fibers, hemp, jute, linen, cellulose, e.g. cotton, silk, wool, ceramic, and stainless steel fibers, or blends thereof. These fibers are normally available in a wide variety of diameters and lengths. Generally, synthetic fibers having lengths of about one-eighth inch to about three-eighths inch and diameters of about 0.5 microns to about 12 microns are preferred.

The adsorbing agents which may be incorporated in the adsorbent material include activated carbon, diatomaceous earth, ion exchange resins and zeolites. Activated carbon removes odor-, taste-, and color-producing impurities; diatomaceous earth enhances the removal of fine particulate and colloidal matter present in the water; and ion exchange resins and zeolites take up dissolved ionic species from liquid undergoing treatment.

The activated carbon may be derived from a variety of sources, such as charcoal, coal, petroleum distillation residues, and the like. Any of the commercially available ion exchange resins may be employed, such as Amberlite ® (Rohm and Haas Co.) or Dowex ® (The Dow Chemical Co.). The applicable zeolites are natural hydrated aluminum silicates of the general formula $Na_2O.Al_2O_3.nSiO_2.xH_2O$, which have ion exchange capability. The loading level of adsorbing agent in the adsorbent material may be as high as possible so long as appreciable dusting of the adsorbing agent from the material does not occur. In general, satisfactory results may be obtained with a loading level of at least 30 weight percent, a loading level of at least 50 weight percent being preferred. When an ion exchange resin is used, it should be milled, to the extent possible, to increase the surface area thereof. Any conventional wet milling apparatus may be used for this purpose.

The adsorbent material may include other constituents, if desired, such as a wet web strengthening agent, a wet web support release agent or a wet strength enhancing agent.

Since, as will be described below, the adsorbent material is made by a wet-lay procedure, the wet web or sheet must have sufficient strength to withstand manipulation during processing. The necessary wet web strength may be provided by incorporating therein fibrous materials, such as polyester fibers or rayon fibers.

The wet adsorbent material has a tendency to stick to the support screen on which it is formed, e.g. the screen of a Fourdrenier machine or a hand sheet mold, particularly when it contains high loadings of particulate materials. It has been found that the addition of a small amount of polyvinyl alcohol fibers is surprisingly effective in alleviating this sticking problem. Other forms of polyvinyl alcohol, e.g. powder, may also be used.

The wet strength enhancing agent best suited for the adsorbent materials used in the present invention is a melamine-formaldehyde resin, and preferably an aqueous colloidal suspension of cationic melamine-formaldehyde prepared by the condensation of melamine and formaldehyde in an aqueous acid medium, as described in U.S. Pat. Nos. 2,345,543 and 2,559,220. The amount of wet strength enhancing agent used should be sufficient to impart the desired wet strength to the finished adsorbent material, but not so much as to impair the function of the other constituents of the material. Other wet strength enhancing agents, which are well known in the paper making art may also be employed.

If desired, the function of the polymer micro-bits and the ion exchange adsorbing agent may be combined in the same material. This may be accomplished by appropriate chemical modification of the polymer micro-bits. Briefly, polystyrene micro-bits having strong-acid, cation-ion exchange capability may be prepared by chemically bonding sulfonic acid groups to the surface of the micro-bits. Such chemical modification of the micro-bits may be accomplished using common sulfonating agents, such as concentrated sulfuric acid, fuming sulfuric acid, chlorosulfonic acid, or mixtures thereof. Chlorosulfonic acid is the preferred chlorinating agent from the standpoint of producing the highest degree of sulfonation. The resultant product generally has a total capacity at least about 2.5 meq/dry gm. One of the notable advantages of the sulfonated micro-bits is that the operating capacity of the sulfonated micro-bits closely approximates the total capacity, since the ion exchange functionalities are on the surfaces of the micro-bits, and thus readily accessible to the liquid undergoing treatment. In addition, it is believed that the sulfonated micro-bits offer certain advantages over commercially available cation exchange resins, in that they exhibit faster exchange kinetics and are relatively resistant to osmotic shock. The rapid exchange kinetics should make it possible to use stoichiometric amounts of regenerating reagent, rather than rely on mass action using a large excess of regenerating reagent.

Alternatively, polystyrene micro-bits having anion exchange capabilities may be prepared by ozonating an aqueous slurry of the polystyrene micro-bits, and then flushing the slurry with nitrogen. Thereafter, methacrylamidopropyltrimethylammonium chloride and reducing agents are added to the slurry at low temperature (on the order of 50° C.), whereby the methacrylamidopropyltrimethylammonium chloride may be grafted to the surfaces of the micro-bits. The modified micro-bits are acidified and any unreacted methacrylamidopropyltrimethylammonium chloride is removed, e.g. by flushing with deionized water.

Further details regarding the chemical modification of polymer micro-bits to bind ion exchange functionalities thereto will be described hereinbelow.

The chemically modified micro-bits are readily incorporated in the fibrous matrix of the adsorbent material using standard paper making techniques, as will also be described below.

The liquid-permeable material utilized in the filter device of this invention may be any material that permits passage of liquid through the device along the desired flow path, i.e. generally parallel to the confronting surfaces of the layer of adsorbent material and liquid permeable material. Suitable liquid-permeable materials include various organic and inorganic fibrous sheet materials, including those made from polyester, polyolefin, polyamide, e.g. nylon, acrylic and polytetrafluoroethylene fibers, as well as metal, e.g. stainless steel fibers and ceramic fibers. However, glass fiber sheet materials are preferred. Such materials typically consist of glass fibers and a binding agent. The glass fibers may range from about 0.25 cm. to about 0.635 cm. in length and from about 0.5 microns to about 4 microns in diameter. The binding agent may be either an organic resin binder, such as polyvinyl alcohol, in fiber or powder form, or an aqueous acrylic or vinyl chloride polymer emmulsion, or an intimate blend, or cobeat, of cellulose fibers and the aforementioned polymer micro-bits. In certain formulations of the liquid-permeable material it is desirable to use a combination of binding agents, e.g. polyvinyl alcohol together with cobeat.

Polymer micro-bits may be incorporated in the liquid-permeable material as a separate component, apart from the binding agent, to serve as a bulking agent. The liquid-permeable material may also contain fibrous additives, e.g. polyester or acetate fibers, in order to enhance the wet web strength of the material, which may be necessary during production of the material. Such fiber additives, when used, are conveniently incorporated into the material during preparation of the cobeat. The liquid-permeable material may also include a wet strength enhancing agent, such as the melamine-formaldehyde resin described above.

The liquid permeable material should be sufficiently porous to provide reasonable flow rates. What is considered a reasonable flow rate may vary widely depending on the particular application of the device. For example, when treating a relatively small volume of aqueous liquid under gravity flow to obtain potable water, a flow rate between about 1 liter/hr. and about 4 liters/hr. may be considered reasonable for a unit with a filter element having a surface area of about 50 sq. cm. On the other hand, when treating a large liquid volume under pressure operation, a flow rate between about 2 liters/min. and about 20 liters/min. may be considered reasonable for a unit with a filter element having a surface area of about 200 sq. cm. Of course, using gravity flow, the flow rate will vary depending on the hydrostatic pressure head.

The porosity of the liquid-permeable material may be varied by appropriate selection of the fiber diameter of the fibrous component and the relative amounts of cobeat and/or polymer micro-bits incorporated therein. Liquid permeable materials of the type just described are disclosed in my U.S. Pat. Nos. 4,239,516 granted Dec. 16, 1980, 4,286,977 granted Sept. 1, 1981 and 4,293,378 granted Oct. 6, 1981.

Both the adsorbent material and the liquid-permeable material are conveniently prepared by a wet-lay process using conventional paper-making technology. Details of the preparation of these materials are set forth in my aforementioned U.S. Pat. Nos. 4,239,516, 4,286,977, 4,293,378, and 4,395,332, the entire disclosures of which are incorporated by reference in the present specification, as if written out in full herein. Most of the filter materials described in these patents are obtainable from Crane & Co., Inc., Dalton, Mass.

Fabrication of the filter device of the present invention may be accomplished quite simply by cutting the adsorbent material and liquid-permeable material into annular discs, using a ordinary paper cutting die, interdigitating the cut discs into a stack, mounting the stack on the perforated tubular duct secured in the end cap of the housing between suitable seal means, as shown in FIGS. 1 or 2, and imposing a pre-determined compressive force on the stack by appropriate adjustment on stop means.

In operation, the liquid to be treated using the filter device is generally admixed with a filter aid prior to introduction into the device. Suitable filter aid materials include diatomaceous earth, perlite, fuller's earth, vermiculite, volcanic ash or fly ash, diatomaceous earth being preferred. The amount of filter aid should be at least 5 ppm. of the untreated liquid.

Referring to the device of FIG. 1 for purposes of illustration, the liquid stream is introduced into opening 21, flows from the periphery of the filter element 13 toward the passage in the center thereof, passes into tubular duct 25 through the perforations therein and is discharged through opening 23. When pressure operation is employed, discharge opening 23 is preferably disposed above inlet opening 21 so that a very slight back pressure, provided e.g. by steam, will act to dislodge the filter cake from the surface of the filter element, causing it to fall into the interior of the housing from were it may be recycled, if desired. A typical filtration cycle may comprise three to four hours of filtration, with four to five seconds of backwashing.

Although the flow path of the liquid through the filter element has not been determined with any degree of certainty it is believed to be primarily along the interface of adjacent confronting surfaces of the adsorbent material and liquid-permeable material. Evidence supporting this belief has been provided by tests in which a colored solution was passed through the filter device. Upon inspection of the liquid-permeable material after filtration of the colored test solution, it was noted that the exterior surface of discs had become partially colored, the color extending inwardly from the periphery, but that no penetration of color into the interior of the fiber matrix was apparent.

The following examples further describe the manner and process of making and using the present invention and set forth the best mode contemplated by the inventor for carrying out the invention, but are not to be construed as limiting the invention.

Examples I through IV describe the preparation of representative adsorbent materials which may be used in the filter device of the present invention.

EXAMPLE I

Cobeat Preparation

A polyester-containing cobeat of cellulose fibers and polystyrene micro-bits was prepared according to Example I of my aforesaid U.S. Pat. No. 4,293,378. The cobeat was dried and collected for use in preparing the furnish for the adsorbent materials and liquid permeable materials described in the following examples.

EXAMPLE II

Adsorbent Material Containing Activated Carbon

A first pulper charge was prepared from the cobeat of Example I, containing about 14 kg. of cellulose, about 7 kg. of polystyrene micro-bits and about 1.5 kg. of polyester fiber, together with an additional 27.3 kg. of polyester fiber and 15,152 liters of water. The charge was mixed in the pulper for two minutes and transferred to a beater chest.

A second pulper charge was prepared from the cobeat of Example I, containing about 120 kg. of cellulose, about 60.0 kg. of polystyrene micro-bits and about 12.5 kg. of polyester fiber together with an additional 42.3 kg. of polystyrene micro-bits, 295.5 kg. of finely activated carbon (Westvaco's AQUA-NUCHAR) and 15,152 liters of water. This second charge was mixed for ten minutes and it too was transferred to the beater chest.

A third pulper charge containing 3788 liters of water and 113.6 liters of melamine-formaldehyde resin of the type described above was mixed in the pulper for 30 seconds and transferred to the beater chest.

Five minutes after the addition of the melamine-formaldehyde resin to the beater chest, 2.3 kg. of polyvinyl alcohol fibers was added to the beater chest.

The slurry from the beater chest was pumped to the machine chest and then to the head box of a Fourdrenier machine, from where it flowed out through the slice and onto the moving Fourdrenier screen. The resultant web of adsorbent material was dewatered using drum dryers set at about 127° C.

EXAMPLE III

Adsorbent Material Containing Ion Exchange Resin

A 100 gm. sample of IR-120P cation exchange resin (available from Rohm & Haas) was placed in a conventional laboratory ball mill with sufficient water to cover the resin, and milled for two hours. The contents of the ball mill, which had a solids content of 47.4%, was admixed with 10 liters of water, 50 gms. of the cobeat of Example I, 12 gms. of acetate fiber (one-quarter inch average length and one and one-half dernier) and 1.5 gms. of polyvinyl alcohol fiber, in a 20 liter vessel with continual stirring until a uniform dispersion was obtained. A 2000 ml. aliquot of the dispersion was poured into a one foot square hand sheet mold containing about 20 liters of water. The water was drained from the hand sheet mold and the mold screen, with the newly formed adsorbent material thereon, was passed over a vacuum slit until it was dewatered sufficiently to permit removal from the mold screen. The appropriate degree of dewatering can readily be determined by trial. The material was then thoroughly dried on a hot plate set at 115° C. The amount of cation exchange resin in the hand sheet was determined to be 18 weight percent. It is believed that a substantial portion of the ion exchange resin was lost through the hand sheet screen, due to the fine particle size thereof.

EXAMPLE IV

Adsorbent Material Containing Sulfonated Polystyrene Micro-Bits

A batch of sulfonated polystyrene micro-bits was prepared by the following procedure. Into a 300 ml. reaction vessel was placed 4 gms. of polystyrene micro-bits (prepared as described in Example I of my aforementioned U.S. Pat. No. 4,207,378) and 16 gms. of diatomaceous earth (Celite 545), followed by 150 ml. of fuming sulfuric acid, and then by a mixture of 100 mls. of concentrated sulfuric acid and 10 mls. of chlorosulfonic acid. The reaction vessel was stoppered, placed in a mechanical shaker and shook for about 20 hours. The reaction proceeded without requiring an external heat source. The product was mixed with 2500 ml. of dilution water, with stirring to form a slurry, filtered through a glass fiber filter of the type described in my aforementioned U.S. Pat. No. 4,293,378, and rinsed with distilled water until the pH of the filtrate was neutral.

Diatomaceous earth was included in the reaction mixture in order to reduce the product's resistance to liquid flow, as had been experienced during earlier preparations, and thereby facilitate dewatering of the sulfonated micro-bits. The diatomaceous earth may be mixed with the sulfonated micro-bits to improve dewatering thereof after the sulfonation reaction is completed.

An adsorbent material containing the sulfonated micro-bits was prepared by admixing 360 gms. of the wet product (having a 17.4% solids content), 40 gm. of the cobeat of Example I, above, and 10 liters of water, with continual stirring. Hand sheets were made from the resulting dispersion according to the procedure of Example III, above.

Examples V and VI describe the preparation of representative liquid permeable materials which may be used in the filter device of the present invention.

EXAMPLE V

A liquid permeable material composed of a cobeat of cellulose fibers and polystyrene micro-bits, glass microfibers and polyvinyl alcohol fiber was prepared according to the procedure of Example IV of my aforesaid U.S. Pat. No. 4,286,977, but substituting the cobeat of Example I, above, for the cobeat in Example IV of the patent. The finished web of liquid permeable material contained about 4.24 kgs. of cobeat (in the ratio of two parts cellulose fibers to one part polystyrene micro-bits), 0.3 kgs. of polyester fibers, 0.91 kgs. of polyvinyl alcohol and 113.5 kgs. of glass fibers. The material was approximately 0.46 mm. thick and had a basis weight of 10.45 kgs. per 120.9 sq. m.

EXAMPLE VI

A liquid permeable material composed of the cobeat of Example I, above, polystyrene micro-bits, polyvinyl alcohol powder (98% hydrolyzed), a mixture of type K and type DE glass fibers and an aqueous colloidal suspension of cationic melamine-formaldehyde resin was prepared according to Example II of my aforesaid U.S. Pat. No. 4,293,378. The finished liquid permeable material contained 14.5 kgs. of micro-bits, 6.2 kgs. of cellulose, 0.6 kgs. of polyester fiber, 6.4 kgs. of polyvinyl alcohol, 90.8 kgs. of glass fiber and about 0.2 kg. of melamine formaldehyde resin. The basis weight of the finished material was 15.1 kg. per 100 square meters.

Several filtration units, designated hereinbelow as A, B, C, and D, were assembled using a five inch length of three inch diameter polyvinyl chloride pipe, joined at one end to a three inch by one inch reducing coupling, and at the other end to a three inch by one-quarter inch reducing coupling, to provide a tubular housing with openings at either end. The one and one-quarter inch opening was provided with a one and one-quarter inch by one inch double tapped bushing with one end projecting into the housing. The end of the bushing projecting into the housing engaged the threaded end of a three inch long by a one inch diameter perforated plastic nipple. The adsorbent material and liquid permeable material described in the above examples were cut into annular sheets or discs, having an inner diameter of one and five-sixteenth inches and an outer diameter of two and one-half inches, and alternately placed around the perforated plastic nipple in a stack between compressible, liquid impervious, rubber washers, one-quarter inch thick. The discs of adsorbent material and liquid permeable material were maintained in place on the perforated plastic nipple by engaging the free end thereof, which was also threaded, with a one inch diameter polyvinyl chloride pipe cap. The type and number of discs of adsorbent sheet material and liquid permeable sheet material used in each of the filter units is set forth in the table below.

| Filter Unit | Adsorbent Material | No. of Discs | Liquid Permeable Material | No. of Discs | Stock Height (cm approx.) |
|---|---|---|---|---|---|
| A | Carbon-Loaded Sheet of Example II | 33 | Glass Fiber Sheet of Example V | 32 | 1.9 |
| B | Carbon-Loaded Sheet of Example II | 33 | Glass Fiber Sheet of Example VI | 32 | 2.3 |
| C | Cation-Exchange Resin Loaded Sheet of Example III | 35 | Glass Fiber Sheet of Example VI | 34 | 3.3 |
| D | Sulfonated Polystyrene Micro-Bits-Loaded Sheet of Example IV | 35 | Glass Fiber Sheet of Example VI | 34 | 3.8 |

Examples VII through XII describe specific filtering applications using Filter Units A, B, C, and D.

EXAMPLE VII

A test liquid was prepared by adding 5 ml. of a 0.2% solution of methylene blue dye in 95% ethanol to 400 ml. of tap water. The resulting test liquid, which was deep blue in color, was passed through Filter Unit A using gravity flow. The average flow rate was about 40 ml./min. No blue color was observed in the filtrate.

EXAMPLE VIII

A test liquid, prepared as in Example VII, was passed through Filter Unit B using gravity flow. The average flow rate was about 240 ml./min. The filtrate had a noticable blue color that was much lighter than the original test liquid.

EXAMPLE IX

The filtration run of Example VIII was repeated, except that 5 gms. of diatomaceous earth (Celite 545) and about 1 gm. of activated charcoal (Hydrodarco B) was added to the test liquid before introduction into Filter Unit B. The average flow rate was 130 ml./min. The filtrate was colorless.

The unit was disassembled and no sign of penetration of the charcoal particles into the liquid permeable discs was noted, despite the relatively small particle size of the charcoal, which is given by the manufacturer to be in the 1 to 5 micron range.

EXAMPLE X

A 2 liter of turbid water believed to contain about 100 ppm. of chlorine, 20 ppm. of malathion (a commercial insecticide), minor amounts of feric chloride ($FeCl_3$) and alum ($Al_2(SO^4)_3$) and an undetermined amount of colloidal matter was filtered through Filter Unit A using gravity flow. The average flow rate was about 40 ml./min.

The filtrate appeared colorless and crystal clear. The chlorine concentration in the filtrate was measured periodically and found to vary between about 0.2 ppm. and 1.0 ppm., as determined spectrophotometrically. There was no trace of melathion in the filtrate.

EXAMPLE XI

Filter Unit C was used for the removal of sodium ion from a 5% NaCl test solution. The ion-exchange resin was conditioned by passing one liter of a 7% HCl solution through the unit, followed by distilled water until the pH of the effluent was determined to be neutral. A 200 ml. aliquot of the test solution was then passed through the filter unit using gravity flow at an average flow rate of about 100 ml./min. The filtrate was titrated against a 1.0 N solution NaOH and a 6.6. ml. addition of the base was required to reach a phenolphthalein end point. The exchange capacity of the adsorbent discs, based on a weight of 1.66 gms. for the ion exchange content thereof (18% of 35 ion exchange resin-containing discs, weighing 9.23 gms.), was about 4 meq./gm. The adsorbent material was regenerated using the 7% HCl solution at a flow rate of approximately 100 ml./min. and washed with distilled water until the effluent had a neutral pH. The filtration of the test solution was twice repeated and no loss of capacity was noted after regeneration.

EXAMPLE XII

Filter Unit D was also used for the removal of sodium from a 5% NaCl test solution. The ion exchange material was conditioned by passing one liter of 7% HCl solution through the unit, followed by water until the pH of the effluent was neutral. A 200 ml. sample of the test solution was passed through the filter unit using gravity-flow at an average flow rate of about 100 ml./min. The filtrate was titrated against a 1.0 N NaOH solution, and a 5.3 ml. addition of the base was required to reach a phenolphthalein end point. The ion-exchange capacity of the discs of adsorbent material, based on a weight of 1.94 gms. for the sulfonated micro-bits content thereof (20% of 35 sulfonated polystyrene micro-bits containing discs, weighing 9.675 gms.) was 2.8 meq./gm.

EXAMPLE XIII

A filter unit for pressure operation, like that shown in FIG. 2, was made from a stainless steel cylindrical shell nine inches long and six inches in diameter, which was closed at one end and open at the other. A one inch diameter opening was provided in the closed end of the sheet and a stainless steel standard pipe nipple, one inch in diameter and eight inches long was welded into the opening, with about one inch of the nipple extending outside the shell. Sixty-seven of the above-described carbon-loaded sheets of Example II and sixty-six glass fiber sheets of Example V, cut as described above were interdigitated and mounted on the nipple and maintained thereon by the use of a compression gland and a compression nut tightened to provide a stack height of about 3.8 inches. A stainless steel base plate was secured to the open end of the shell to complete the housing.

The final effluent of a paper making plant was treated by diverting a waste stream on its way from a clarifier to a settling pond and passing it through the filter unit just described. The waste stream contained significant amounts of dissolved and suspended matter, including cellulosic fibers, pigment and clay. Filtration was begun under a pressure of 10 psi, with a flow rate of about 0.6 gals/min. Over approximately 2 hours of operation, the pressure was raised to 14 psi and the flow rate slowed by about 50%. The filtrate obtained was crystal clear in appearance.

It should be understood that the description of the invention set forth in the foregoing specification and examples is intended merely to illustrate and not to limit the invention. Moreover, it will be appreciated by those skilled in the art that the implementation of the different aspects of the above-described invention is capable of wide variation or modification without departing from the spirit and scope of the invention as set forth in the appended claims.

What is claimed is:

1. A liquid filtration device comprising housing means, including an inlet and outlet, for directing liquid flow through the housing means, and dividing means which divides the housing means into inlet and outlet chambers, said inlet chamber being in flow communication with said inlet and said outlet chamber being in flow communication with said outlet, the dividing means comprising filter means including a plurality of layers of adsorbent material, comprising a porous, nonwoven fibrous matrix in which is included an adsorbing agent for removing dissolved or suspended matter from said liquid, and a plurality of layers of liquid-permeable material, said layers of adsorbent material and liquid-permeable material being interdigitated in a stack disposed between seal means preventing liquid penetration into the ends of said stack, each layer having a substantially flat surface confronting and engaging an adjacent layer.

2. A liquid filtration device according to claim 1, wherein said seal means comprise end plates, and said layers of stacked, interdigitated adsorbent material and liquid impervious material are in the form of annular discs having inside and outside edges, said stacked discs providing a filter zone having substantially coextensive interior and exterior dimensions defined by said disc edges, and having a flow path through said filter zone which is edge to edge through said stacked discs, with one edge being in fluid communication with said inlet chamber and the other edge being in fluid communication with said outlet chamber.

3. A liquid filtration device according to claim 2, further including a perforated tubular duct extending axially into the outlet chamber, said outlet chamber being defined by the inside edges of the stacked discs.

4. A liquid filtration device according to claim 3, further including stop means for maintaining said stack of interdigitated discs of adsorbent material and liquid permeable material under a compressive force between said end plates.

5. A liquid filtration device according to claim 4, wherein said end plates are annular, having interior and exterior dimensions substantially coextensive with said discs, said stop means engages said stack and is relatively adjustable for varying the compressive force between said end plates.

6. A liquid filtration device according to claim 1, wherein the fiborus matrix component of the adsorbent material is selected from the group consisting of polyester, polyolefin, polyamide, polyvinyl and flurocarbon resin fibers, acetate, hemp, juted, linen, cellulose, silk wool, ceramic, stainless steel or glass fibers, or blends thereof, and said adsorbing agent is selected from the group consisting of activated carbon, diatomaceous earth, ion exchange resins, and zeolites, and said matrix also includes polymer micro-bits produced from an expanded thermoplastic polymer selected from the group consisting of a styrene-polymer, a lower polyolefin, which is the polymer of an ethyleneically, unsaturated hydrocarbon monomer having from 2 to 6 carbons, or copolymers or blends of said styrene-polymer or polyolefin, said polymer being non-brittle in expanded form, or polymer micro-bits of a flexible, foamed polyurethane, said polymer micro-bits being substantially completely free of intact cells of the expanded or foamed polymer from which they are produced.

7. A liquid filtration device according to claim 6, wherein said liquid-permeable material comprises a glass fiber sheet.

8. A liquid filtration device according to claim 1, wherein the fibrous matrix component of the adsorbent material is selected from the group consisting of polyester, polyolefin, polyamide, polyvinyl and flurocarbon resin fibers, acetate, hemp, jute, linen, cellulose, silk, wool, ceramic, stainless steel, or glass fibers, or blends thereof, and said adsorbing agent comprises polymer micro-bits produced from an expanded thermoplastic polymer selected from the group consisting of a styrene-polymer, a lower polyolefin, which is the polymer of an ethylenically, unsaturated hydrocarbon monomer having from 2 to 6 carbons, or copolymers or blends of said styrene-polymer or polyolefin, said polymer being non-brittle in expanded form, said polymer micro-bits being substantially completely free of intact cells of the expanded polymer from which they are produced, and said polymer micro-bits having ion exchange functionalities chemically bound thereto.

9. A liquid filtration device according to claim 8, wherein said liquid permeable material comprises a glass fiber sheet.

10. A liquid filtration device according to claim 8, wherein said ion exchange functionalities are cation exchange functionalities.

11. A liquid filtration device according to claim 8, wherein said ion exchange functionalities are anion exchange functionalities.

12. A liquid filtration device according to claim 8, wherein said adsorbing agent includes diatomaceous earth.

13. A filter assembly comprising a plurality of filter devices connected in series, each of said filter devices being the filtration device of claim 1.

14. A filter assembly according to claim 13, wherein at least one of said filter devices has cation-exchange resin-containing adsorbent in the adsorbent material thereof and at least one of said filter devices has an anion-exchange resion-containing adsorbent in the adsorbent material thereof.

15. A filter assembly according to claim 14, wherein at least one of said filter devices has an activated carbon-containing adsorbent in the absorbent material thereof.

16. A liquid filtration device according to claim 1, which includes a rigid, perforated, tubular sleeve surrounding said stack of interdigitated discs of adsorbent material and liquid permeable material.

17. A liquid filtration device according to claim 1, wherein the interdigitated layers of adsorbent material in said stack are in the form of annular discs having inside and outside edges, said stacked discs providing a filter zone having substantially coextensive interior and exterior dimensions defined by said disc edges, and having of a flow path through said fiter zone which is edge to edge through said stack of discs, with one edge being in fluid communication with said inlet chamber and the other edge being in fluid communication with said outlet chamber, said device including a perforated tubular duct extending axially into the outlet chamber, said outlet chamber being defined by the inside edges of the stacked discs, said seal means being immovably mounted on said duct to compress said stack of interdigitated discs for preventing displacement of said stack when liquid is passed through said device under pressure, and stop means for maintaining said stack of interdigitated discs of adsorbent material and liquid permeable material under a compressive force between said seal means.

18. A liquid filtration device according to claim 17, which includes a rigid, perforated, tubular sleeve surrounding said stack of interdigitated discs of adsorbent material and liquid permeable material.

19. A liquid filtration device according to claim 17, which includes a second positioned outlet in said inlet chamber so as to allow a stream of liquid to pass through said device without flowing through said stack of interdigitated annular discs of adsorbent material and liquid permeable material.

20. A liquid filtration apparatus comprising a housing having inlet means at one end, and outlet means at the other end, a tubular duct within said housing, said duct being open at one end and closed at the other end and having a perforated intermediate portion and non-perforated end portions, the open end of said duct being in direct fluid communication with said outlet means, a filter element comprising a plurality of discs of adsorbent material, said adsorbent material comprising a porous, non-woven fibrous matrix in which is included an adsorbing agent for removing dissolved or suspended matter from said liquid, and a plurality of discs of liquid-permeable material, said discs of adsorbent material and liquid-permeable material being in annular form and interdigitated in a stack between seal means preventing liquid penetration into the ends of said stack, each disc having a substantially flat surface confronting and engaging an adjacent disc, said discs of adsorbent material and liquid permeable material circumscribing said perforated tubular duct, and stop means on the end portions of said tubular duct, for maintaining said stack of interdigitated discs of adsorbent material and liquid permeable material under a compressive force between said seal means.

21. A liquid filtration device according to claim 20, wherein said stop means is relatively adjustable for varying the compressive force between said seal means.

22. A liquid filtration device as claimed in claim 21, wherein said seal means comprises end plates of liquid impervious material.

23. A liquid filtration device according to claim 20, wherein said seal means are immovably mounted on said duct to compress the stack of interdigitated discs of adsorbent material and liquid permeable material for preventing displacement of said stack, when liquid is passed through said device under pressure.

24. A liquid filtration device according to claim 23, which includes a rigid, perforated, tubular sleeve surrounding said stack of interdigitated discs of adsorbent material and liquid permeable material.

25. A liquid filtration device according to claim 23, which includes a second outlet means in said housing at said other end of said housing, said second outlet means being positioned so as to allow a stream of liquid to pass through said device without flowing through said stack of interdigitated discs of adsorbent material and liquid permeable materials.

26. A liquid filtration device as claimed in claim 25, wherein said one end of the housing is greater in cross-sectional area than said other end of said housing, and the inlet means and the second outlet means in the housing are disposed such that the path of travel of liquid passing therethrough is generally perpendicular to the longitudinal axis of said housing.

27. A liquid filtration device as claimed in claim 23, wherein said seal means comprises a compression gland and an interior wall surface of said housing.

28. A liquid filtration device according to claim 20, wherein the fibrous matrix component of the adsorbent material is selected from the group consisting of polyester, polyolefin, polyamide, polyvinyl and flurocarbon resin fibers, acetate, hemp, jute, linen, cellulose, silk, wool, ceramic, stainless steel or glass fibers, or blends thereof and said adsorbing agent is selected from the group consisting of activated carbon diatomaceous earth, ion exchange resins, and zeolites, and said matrix also includes polymer micro-bits produced from an expanded thermoplastic polymer selected from the group consisting of a styrene-polymer, a lower polyolefin, which is the polymer of an ethylenically, unsaturated hydrocarbon monomer having from 2 to 6 carbons, or copolymers or blends of said styrene-polymer or polyolefin, said polymer being non-brittle in expanded form, or polymer micro-bits or a flexible, foamed polyurethane, said polymer micro-bits being substantially completely free of intact cells of the expanded or foamed polymer from which they are produced.

29. A liquid filtration device according to claim 28, wherein said liquid permeable material comprises a glass fiber sheet.

30. A liquid filtration device according to claim 20, wherein the fibrous matrix component of the adsorbent material is selected from the group consisting of polyester, polyolefin, polyamide, polyvinyl and fluorocarbon resin fibers, acetate, hemp, jute, linen, cellulose, silk, wool, ceramic, stainless steel or glass fibers or blends thereof and said adsorbing agent comprises polymer micro-bits produced from an expanded thermoplastic polymer selected from the group consisting of a styrene-polymer, a lower polyolefin, which is the polymer of an ethylenically, unsaturated hydrocarbon monomer having from 2 to 6 carbons, or copolymer or blends of said styrene-polymer of polyolefid, said polymer being non-brittle in expanded form, said polymer micro-bits being substantially completely free of intact cells of the expanded polymer from which they are produced, and said polymer micro-bits having ion exchange functionalities chemically bound thereto.

31. A liquid filtration device according to claim 30, wherein said liquid permeable material comprises a glass fiber sheet.

32. A liquid filtration device according to claim 30, wherein said ion exchange functionalities are cation exchange functionalities.

33. A liquid filtration device according to claim 30, wherein said ion exchange functionalities are anion exchange functionalities.

34. The liquid filtration device according to claim 30, wherein said adsorbing agent includes diatomaceous earth.

35. A liquid filtration device according to claim 20, which includes a rigid, perforated, tubular sleeve surrounding said stack of interdigitated discs of adsorbent material and liquid permeable material.

36. A process for removing dissolved, suspended, or particulate matter from a liquid containing same, said process comprising passing said liquid through a liquid filtration device in a given flow direction opposite walls of liquid impervious material, a plurality of sheets of adsorbent material, said adsorbent material comprising a porous, non-woven fibrous matrix in which is included an adsorbing agent for removing dissolved or suspended matter from said liquid, and a plurality of sheets of liquid-permeable material, said layers of adsorbent material and liquid-permeable material being in the form of annular discs which have inside and outside edges and which are interdigitated in a stack between said walls, said stacked discs providing a filter zone having generally coextensive interior and exterior dimensions defined by said disc edges, the flow path in said filter zone being edge to edge through said stacked discs.

37. The process according to claim 36, wherein the liquid in said filtration device is directed so as to flow from the outside edges of said stacked interdigitated discs of adsorbent and liquid permeable materials toward the inside edges thereof.

38. The process according to claim 30, in which said filtration device is provided with inlet means and outlet means, said outlet means being disposed above said inlet means, and the liquid is caused to flow through said device under the influence of an applied pressure.

39. The process according to claim 36, including adding a filter aid material to said liquid prior to passing it through said filtration device.

* * * * *

UNITED STATES PATENT AND TRADEMARK OFFICE
CERTIFICATE OF CORRECTION

PATENT NO. : 4,664,812

DATED : May 12, 1987

INVENTOR(S) : Klein

It is certified that error appears in the above-identified patent and that said Letters Patent is hereby corrected as shown below:

Column 18, line 59, change "a second positioned outlet" to --a second outlet positioned--;

Column 20, line 41, after "direction" insert --comprising--;

Column 20, line 60, change "claim 30" to claim 37--.

Signed and Sealed this

Twenty-ninth Day of November, 1988

Attest:

DONALD J. QUIGG

*Attesting Officer*          *Commissioner of Patents and Trademarks*